United States Patent [19]

Sieja

[11] 3,948,630

[45] Apr. 6, 1976

[54] GUIDE FOR USE IN APPARATUS FOR MANUFACTURING FLAT GLASS

[75] Inventor: Jon S. Sieja, Tarentum, Pa.

[73] Assignee: PPG Industries, Inc., Pittsburgh, Pa.

[22] Filed: Oct. 15, 1974

[21] Appl. No.: 515,127

[52] U.S. Cl. .............. 65/65 A; 65/99 A; 65/182 R; 65/204
[51] Int. Cl.² .......................................... C03B 18/02
[58] Field of Search .......... 65/65 A, 92, 99 A, 202, 65/182 R, 204, 91, 203, 201

[56] References Cited
UNITED STATES PATENTS

| | | | |
|---|---|---|---|
| 2,422,640 | 6/1947 | Yamamoto | 65/204 |
| 2,896,376 | 7/1959 | Crandon, Jr. | 65/204 |
| 3,218,143 | 11/1965 | De Lajarte | 65/182 R X |
| 3,294,510 | 12/1966 | Bauduin | 65/204 X |
| 3,420,647 | 1/1969 | Charnock | 65/182 R X |

Primary Examiner—Arthur D. Kellogg
Attorney, Agent, or Firm—E. Kears Pollock

[57] ABSTRACT

A guide bar for stabilizing the position and orientation of a continuous sheet of flat glass being conveyed upwardly from a forming chamber comprises a transverse element located adjacent the continuous sheet of glass and spaced from it. The guide bar is preferably cooled or otherwise provided with means for controlling its temperature.

28 Claims, 8 Drawing Figures

GUIDE FOR USE IN APPARATUS FOR MANUFACTURING FLAT GLASS

CROSS-REFERENCES TO RELATED APPLICATIONS

This application is related to Application Ser. No. 483,508 entitled, "Manufacture of Glass", filed June 27, 1974 by Gerald E. Kunkle and assigned to the present assignee.

BACKGROUND OF THE INVENTION

1. Field of the Invention

This invention relates to a method and apparatus for the manufacture of a continuous sheet of flat glass wherein the glass is supported on a pool of molten metal during its forming and is then lifted from the pool of molten and conveyed away from it. More particularly, the invention relates to a method for stabilizing the position and orientation of a sheet of glass conveyed upwardly from a pool of molten metal where it had been formed.

2. Description of the Prior Art

Molten glass may be formed into a continuous sheet or ribbon of glass according to the teachings of Heal, U.S. Pat. No. 710,357 or of Hitchcock, U.S. Pat. No. 789,911. Following the formation of a continuous sheet of glass from molten glass, the sheet of glass may be removed from the surface of the supporting pool of molten metal upon which it was formed by conveying it horizontally over some end dam or weir at the end of the forming chamber, but preferably glass is lifted slightly from the surface of the pool of molten metal and then conveyed away from it. According to the teachings of a cross-referenced application of Gerald E. Kunkle, a continuous sheet of glass may be formed from the surface of a pool of molten metal so that it reaches its final width and thickness and then lifted upwardly from the surface of the pool of molten metal and conveyed upwardly, and preferably vertically, from the surface of the pool of molten metal and from an enclosed forming chamber containing that pool of molten metal. When lifting a continuous sheet of relatively hot glass upwardly from a pool of molten metal, it is found desirable to stabilize the orientation and position of the upwardly conveyed sheet of glass immediately above the location where it is lifted from the pool of molten metal upon which it was formed. The present invention provides an apparatus for stabilizing the position of such a continuous sheet of glass.

SUMMARY OF THE INVENTION

A continuous sheet of flat glass is produced by a method including the following steps: Molten glass is delivered onto the surface of a pool of molten metal maintained within a forming chamber. The molten metal is preferably tin, an alloy of tin or some other metal having a specific gravity greater than glass, having a melting point lower than the glass to be formed and being substantially non-reactive to the glass at its melting temperature. The layer of molten glass is advanced along the surface of the pool of molten metal and is cooled during such advance to form a dimensionally stable, continuous sheet of glass.

Forces are applied to the glass while it is advanced along the surface of the pool of molten metal. Forces may be applied to the glass which are aligned substantially along its path to cause it to be advanced. These forces may be sufficient to cause the glass to be attenuated to a thickness less than equilibrium thickness during its advance. These forces are characterized as longitudinal tractive forces and may be applied to any location along the length of the glass sheet. They are preferably applied to the glass at locations well along its path of advance and are transferred to the hot or more fluid glass primarily due to the surface tension of the glass. Other forces may be applied to the glass in a manner such that they are aligned substantially across or transverse to its path of advance, and these are characterized as transverse forces. The resultant forces caused by the application of the described forces in combination with the reactive surface tension and gravity forces acting on the glass cause it to be formed into a continuous, flat sheet of desired thickness.

After the glass has been cooled sufficiently to become dimensionally stable (that is, if it has reached its final width and thickness) it is advanced farther along the surface of molten metal and then is lifted from the surface of the pool of molten metal and conveyed from the forming chamber. It is lifted and conveyed upwardly from the pool of molten metal in the manner described by Gerald E. Kunkle in its copending, commonly assigned patent application which is incorporated by reference herein.

The glass is cooled sufficiently prior to lifting it from the surface of the pool of molten metal so that its width and thickness remain unchanged during lifting and conveyance from the forming chamber. It is desirable to adjust or control the temperature of the glass so that its viscosity will be within the range from about $10^5$ to $10^{12.5}$ poises (gram/centimeter/second) at the time of lifting. It is further desirable to adjust and maintain the temperature of the glass during its upward convenance so that the temperature will be decreased sufficiently to cause the viscosity to be greater than about $10^{13}$ poises while maintaining the glass in flat, planar alignment. While it is possible to contact the continuous sheet of glass by rolls or other devices at the location where it is lifted from the surface of the pool of molten metal, it is preferred that the continuous sheet of glass be permitted to freely form a curved, lifting region having a radius indicated by the temperature and viscosity of the glass rather than by any externally imposed force from a roll or other contacting device.

When the continuous sheet of flat glass is lifted from the surface of the pool of molten metal without engaging the glass by some contacting device in the vicinity of its liftoff location, the glass may be subject to movement which appears as a rotational movement of the vertically disposed portion of the continuous sheet of glass that is being conveyed upwardly from the location of liftoff. This apparent rotational movement of the continuous sheet of glass can cause the continuous sheet of glass to be improperly oriented with respect to the rolls or other contacting elements of a conveyor for engaging and conveying the glass upwardly from the pool of molten metal. Consequently, undesirable stresses may be induced within the glass as it is forced into proper orientation with the conveyor by engaging the first contacting rolls or other elements in the bottom portion of the conveyor. The present invention provides means for preventing undue movement and undesirable orientation of the upwardly conveyed sheet of glass immediately above the pool of molten metal.

A glass sheet guide is disposed across the forming chamber above the continuous sheet of glass advancing along the surface of the pool of molten metal and upstream (that is, between the location of the upwardly conveyed continuous sheet of glass and the inlet end of the forming chamber) so that a sheet of glass that becomes disoriented or misaligned with respect to the plane of conveyance along the conveying means extending from the forming chamber will engage or contact the guide and be prevented from further disorientation. The guide is a device for imposing a force against a continuous sheet of glass to prevent it from moving unnecessarily from its intended path. The guide may impose a direct positive force on the glass or may be a passive device capable of imposing a reaction force due to physical resistance to glass movement to a glass sheet coming into contact or engagement with it.

The guide is disposed transversely across at least a part of the forming chamber. It may extend across the full width of the forming chamber or may extend only across a portion of the chamber sufficient so that the marginal edges of a continuous sheet of glass may engage it. Thus, the guide may comprise a single bar extending across the full width of the chamber or may comprise two separate marginal elements, each extending inwardly from a site of the forming chamber and facing the other element so that one is positioned to engage one marginal edge of a continuous sheet of glass and the other is positioned to engage the opposite marginal edge of a continuous sheet of glass should it become disoriented.

The portion or element of the guide employed in the practice of the invention for occasional contact by the glass is preferably constructed of a material that will not stick to hot glass. It may be constructed of metal such as stainless steel, which is cooled, or may be constructed of carbon or graphite. The element may be, as already indicated, provided with some means of temperature control, such as cooling, and as such may be connected to either means for directing a liquid coolant, such as water, or a gaseous coolant, such as air or a non-oxidizing protective gas, through it. In the latter instance, the guide element for engaging the glass may be provided means for directing a substantial volume of non-oxidizing protective gas into the forming chamber or slowly bleeding such a gaseous mixture into the forming chamber or engage the glass with it rather than engaging the glass by contact between it and a solid, rigid guide element.

Various specific embodiments of this invention are described in detail below and will be further understood with reference to drawings accompanying this application.

DESCRIPTION OF THE PREFERRED EMBODIMENTS

Figure 1:
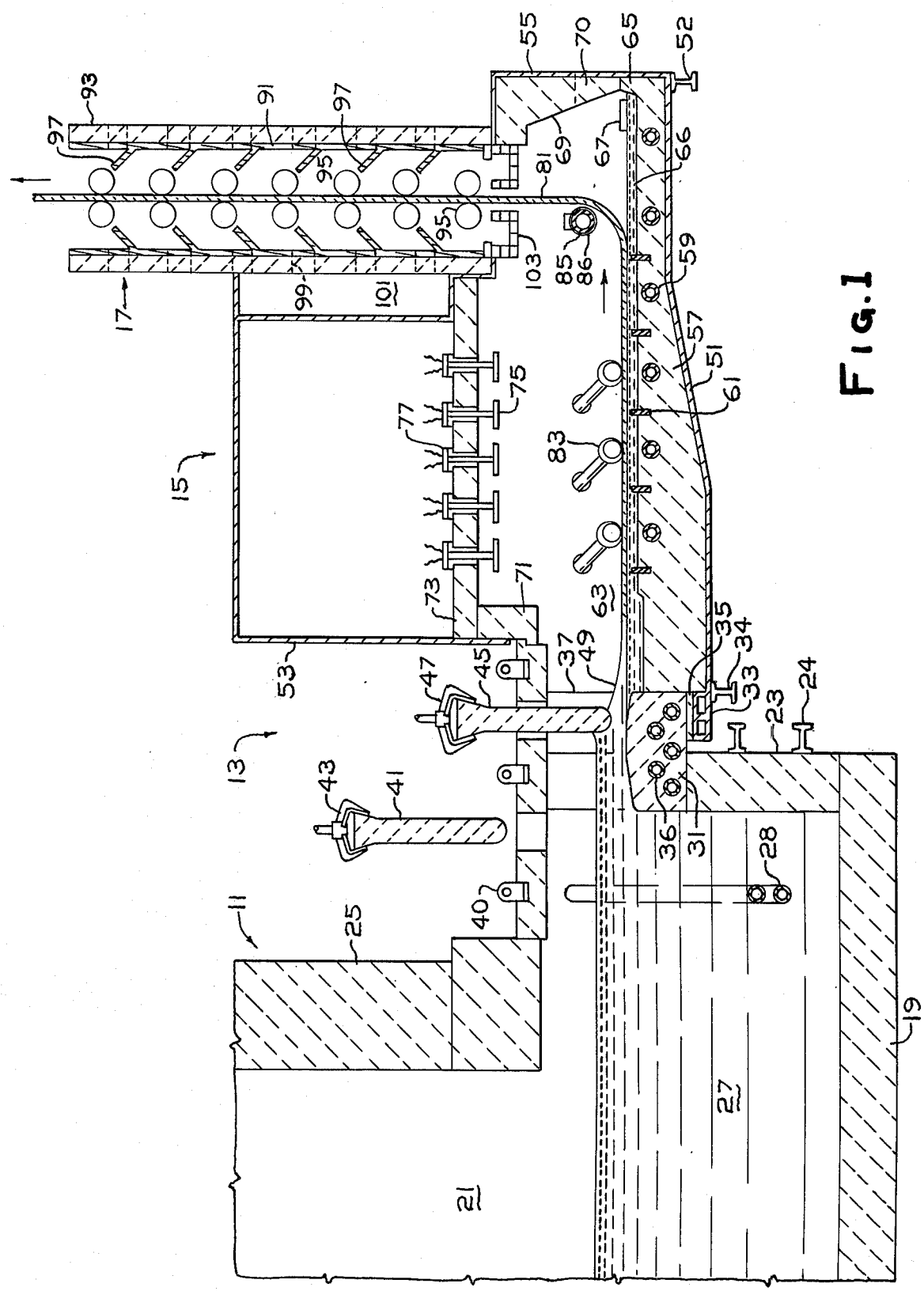
FIG. 1 is a sectional elevation view of an apparatus for producing flat glass in accordance with this invention.
Figure 2:
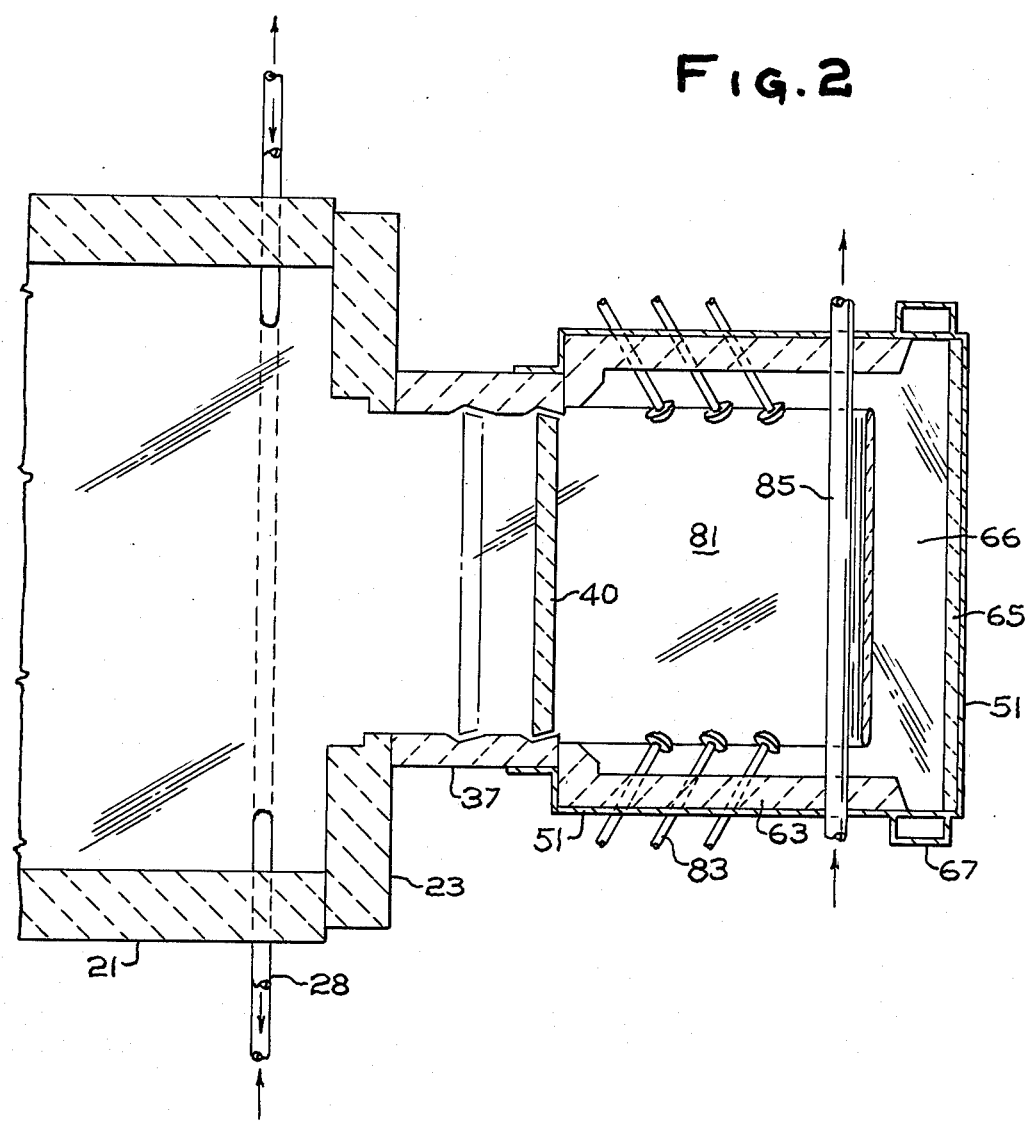
FIG. 2 is a sectional plan view of the apparatus shown in FIG. 1 with the wrapping on the guide bar removed.

Referring now to FIG. 1, there is shown a view of a suitable apparatus for carrying out the present invention. The glassmaking apparatus comprises a furnace 11, delivery means 13 and a forming chamber 15 and a vertical conveyor 17 which may be, and preferably is, included in an annealing lehr. It will be understood that the lifting and conveying apparatus employed in the practice of this invention may be designed to cause the glass to be conveyed along an upwardly extending path that need not be vertical, as shown in FIG. 1.

The glassmaking furnace 11 includes a melting section (not shown) and a refiner or conditioner, the end of which is shown. The refining or conditioning section of the furnace 11 comprises a furnace bottom 19, side walls 21 and a front basin wall 23. The front basin wall 23 is maintained in position by structural members 24. The furnace further comprises an upper front wall 25 which is preferably suspended or supported from above and a roof overlying the upper portion of the furnace, the roof not being shown.

The delivery means 13 includes a threshold 31 resting on a cooling block 33 or other support, which is supported by structural member 34. A cast refractory seal 35 or the like is disposed between the threshold 31 and the cooling block 33. Extending through holes in the threshold are conduits or pipes 36 for transporting coolant or the like through the interior of the threshold 31 and for controlling its temperature during use. At the ends of the threshold 31 there are side wall portions or jambs 37 defining the sides of the channel through which molten glass may be delivered from the pool of molten glass 27 residing in the bottom portion of the furnace 11. The top of the delivery means 13 is defined by a roof 39. The roof is preferably a flat arch which is supported by supporting means (not shown) extending above it and connected to flat arch supporters 40 embedded in the flat arch itself. Extending transversely across the delivery means 13 are two gates or tweels: The first tweel is a backup tweel 41 connected to a support assembly 43 (not fully shown) for raising or lowering it into engagement in the pool of molten glass 27. The second tweel is a control tweel 45 supported by support assembly 47 (not fully shown) for raising and lowering the tweel. The control tweel is held in operating position in contact with the molten glass to be delivered for forming. The control tweel 45, along with the threshold 31 and the jambs 37, defines an opening through which a layer of molten glass 49 may be delivered for forming.

The forming chamber 15 comprises a bottom casing 51 supported on support 62 in addition to support 34. This casing is preferably a casing constructed of metal, such as steel. The casing is preferably impervious to the molten metal in the chamber. The forming chamber 15 further comprises a top casing 53 and an end casing 55. Both of these casing members are also preferably constructed of impervious metal. Disposed within the bottom casing 51 is a refractory bottom 57, preferably a refractory bottom that has been cast in place inside the bottom casing 51. Preferably embedded within the bottom refractory 57 are pipes 59 through which coolant or other fluid may be directed for controlling the temperature of the forming chamber 15 at discrete locations along its length. Also extending transversely across the forming chamber 15 are dams or weirs 61 mounted in the refractory bottom 57 and extending across its width. These dams are preferably vertically movable and are held down at their ends at each side of the forming chamber. They are preferably constructed of material that is less dense than the molten metal in the forming chamber so that their vertical position may be varied upwardly or downwardly by controlled adjustment of holddown devices at their ends.

The forming chamber 15 further comprises refractory side walls 63 and a refractory exit lip 65. These, along with the bottom refractory 57 and the threshold 21, define a container in which a pool of molten metal 66, preferably molten tin or an alloy of tin, is disposed. At the downstream end of the forming chamber there is provided extension 67 of the bottom container portion of the forming chamber which serve as cavities into which dross floating on the surface of the moten metal 66 may be withdrawn for removal from the forming chamber. The upper portion of the forming chamber includes an end wall liner 69 preferably constructed of refractory material. This liner 69 and the end casing 55 to which it is connected may include a suitable opening 70 through which a continuous sheet of glass may be withdrawn from the forming chamber along a substantially horizontal path in the event that such removal is temporarily desired.

The upper portion of the chamber further includes a lintel 71 at its upstream end. This lintel 71 may be used as a means for supporting delivery means roof 39. Additionally the upper portion of the chamber includes a ceiling or roof 73 preferably constructed of a refractory material which is suitable for radiating or absorbing heat uniformly over the area facing the glass beneath it during operation. Extending through the ceiling of the forming chamber are controllable heating elements 75 used to control the rate of heat removal from the glass during forming. These heating elements are connected to bus bars 77 which are connected, in turn, to a source of power (not shown). The upper portion of the forming chamber 15, preferably includes a top casing end wall 79 providing a space between the upper portion of the forming chamber 15 and the upstream or furnace side of the conveyor mechanism 17. During operation a protective gas, such as a mixture of hydrogen and nitrogen or other non-oxidizing gas, is preferably directed into the forming chamber and the conveyor.

Advancing along the surface of the pool of molten tin 66 is a continuous sheet of glass 81 formed from the layer of molten glass 49 delivered onto the pool of molten tin for forming. Extending into the forming chamber through its side walls there may be provided edge contacting devices 83 for applying outward tractive forces to the layer of glass 49 during its advance along the pool of molten metal for forming. These devices are preferably wheels disposed, oriented and driven in such manner as to apply opposing outward or transverse forces to the glass to maintain its width during its attenuation. The resultant forces resulting from the combination of longitudinal and transverse forces acting on the glass cause it to be attenuated to a thickness that is less than that which would be attained by molten glass if allowed to remain on the surface of the pool of molten metal for a sufficient time to come to equilibrium with it.

Extending across the width of the forming chamber 15 above the pool of molten metal 66 and upstream of the vertically disposed sheet of glass is a guide bar 85. This guide bar provides a facility for intermittently engaging the sheet of glass as it is conveyed upwardly. When the glass moves out of alignment with the plane of the conveyor (that plane is normal to the surface of the pool of molten metal and normal to the path of glass advance along the pool) it is engaged by the guide bar, usually at or near a marginal edge of the glass sheet. The glass sheet then gently rebounds into alignment with the desired conveyor plane. The guide bar is preferably hollow and will usually be a pipe such as a stainless steel pipe or an ordinary iron pipe. It is preferably wrapped with a graphitized refractory cloth 86 or other material that does not stick to or is wet by glass at its lifting temperature. The guide bar 85 is preferably cooled by directing a coolant, such as water, through it. In order to avoid undue cooling of the glass in the instance where glass is being produced at a relatively low rate, cooling may be accomplished on a diminished scale by directing air through the pipe.

The vertical conveyor 17 comprises a machine casing 91 and thermally insulated machine walls 93. The machine walls 93 are preferably constructed of refractory material. Within the vertical conveyor there is a series of supporting rolls 95 for engaging a continuous sheet of glass 81 for conveying it upwardly through the conveyor. These machine rolls are operated in a coordinated manner. They are used to apply sufficient tractive forces to the glass to convey it upwardly and to transmit tractive forces along the glass downwardly and about the curved glass at liftoff to the hot or more fluid glass within the advancing layer of glass 49 where the glass is hotter and fluid and susceptible to forming and attenuation. Disposed across the internal space within the conveyor casing at several locations along its length are machine seals 97 for retarding the flow of gases either upwardly or downwardly through the enclosed spaced surrounding the rolls 95. Extending through the walls of the enclosed conveyor are openings 99 through which cullet may be directed in the event the continuous sheet of glass is chipped or broken in the upper portion of the conveyor. A space is provided between the top casing of the forming chamber and the walls of the vertical conveyor for accommodating cullet removal. This space is characterized as a cullet chamber 101.

In a preferred embodiment of this invention coolers 103 are disposed across the bottom portion of the vertical conveyor to control the removal of heat from a continuous sheet of glass 81 as it is conveyed upwardly from the surface of the pool of molten metal of the forming chamber.

Figure 3:
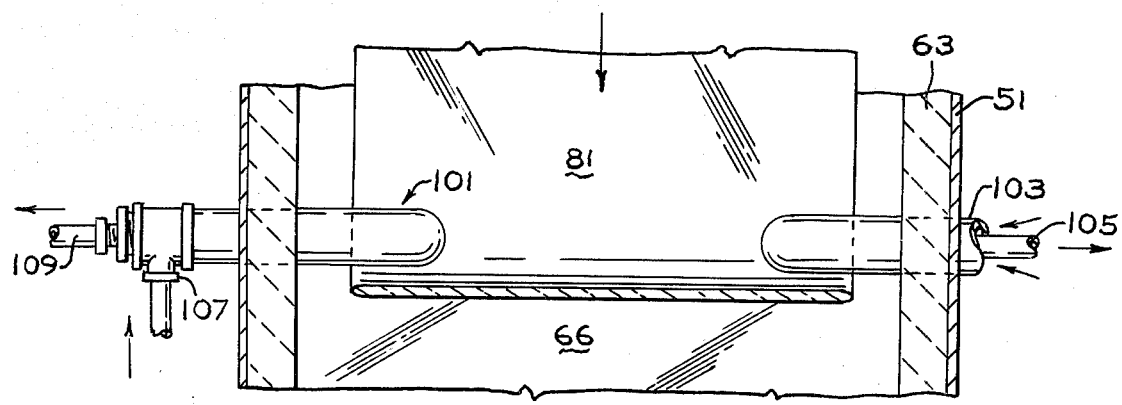
FIG. 3 is a partial sectional plan view of the forming chamber shown in FIGS. 1 and 2 showing only the immediate glass liftoff area with an alternate embodiment of the present invention.

In FIG. 3 there is shown an alternate embodiment of this invention. In this embodiment, rather than providing a guide bar extending fully across the width of a forming chamber, there are provided two separate guide members 101, each extending inwardly through a side wall 63 of the forming chamber. They extend inwardly past the intended locations for the marginal edges of a sheet of glass 81 being formed on the molten metal 66. Each guide member preferably extends over the glass sheet for at least about one tenth of its intended width to insure engaging the glass should it deviate from its desired plane.

Each of these guide members 101 comprises an outer tubular member 103, and an inner tubular member 105 which are mounted together to provide an annular space between them. A coolant may be directed through the guide element 101 by passing it in sequence through the annular space between the tubes and then through the inner tube or vice versa. Connected to the individual guide members 101 and located external to the forming chamber are fittings 107 and 109 for connection to a source and sink of coolant (not shown). As may be seen in FIG. 3, the fitting 107 provides communication with the annular space and the fitting 109 provides communication with the interior space of the inner tube 105. The inner tube is preferably fixedly mounted in relation to the outer tube and spacers (not shown) and may be located within the annular space to maintain the separation between them. The end of the outer tube 103 is capped and the inner tube 105 is somewhat shorter than the outer tube to provide communication between the annular space and the interior space of the inner tube.

Figure 4:
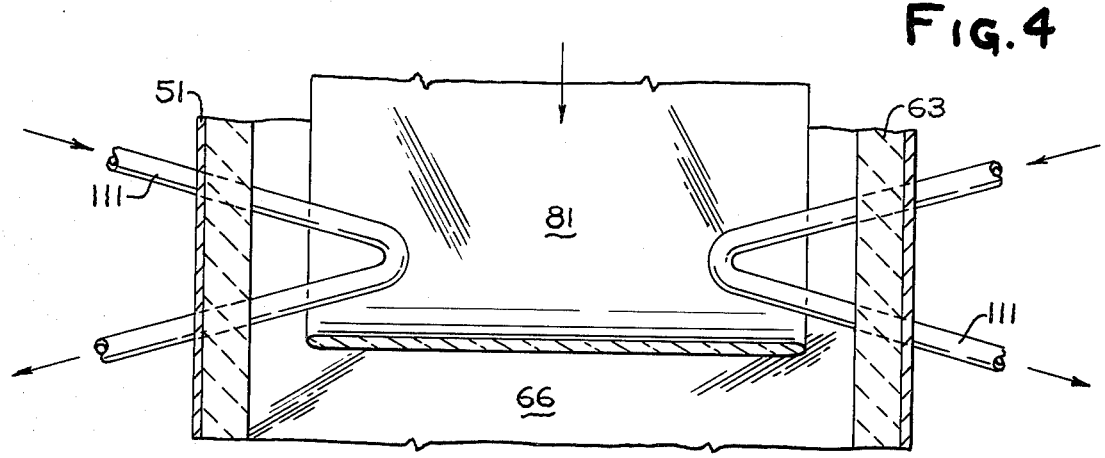
FIGS. 4, 5, 6 and 7, like FIG. 3, are partial sectional plan views of the liftoff region of a forming chamber, such as shown in FIG. 2, each illustrating a different embodiment of the present invention.

In FIG. 4 there is shown a further embodiment of this invention comprising a pair of V-shaped guide members (when seen in plan view). The apex of each V-shaped guide member overlies the advancing glass on the pool of molten metal. The downstream legs of the V-shaped guide members diverge from each other moving from their respective apexes toward the side walls of the forming chamber.

In this embodiment the portion of the guide member 111 facing the upwardly ascending portion of the continuous sheet of glass 81 is angled toward its marginal edges. One advantage of this embodiment of this invention is that there is a small, limited area of contact between the continuous sheet of glass 81 and the guide member 111, when a continuous sheet of glass 81 becomes momentarily disoriented. This minimizes any superficial marking of the glass that could otherwise occur if there were extended contact between one of the two guide members and the glass and that contact occurred while the glass was sufficiently soft to be marked. The same angular relationship between a guide member and the marginal portion of the continuous sheet of glass as it is upwardly ascending may be provided in other embodiments of the invention, such as those shown in FIGS. 5 or 6. In the instance of the embodiment shown in FIG. 5 the surface of the guide member 115 is effectively conical with its ends flaring outwardly from a narrow central portion. In the instance of the guide member shown in FIG. 6 the glass facing portion of the guide member is a gentle concave curve.

Referring back now to the embodiment of the invention shown in FIG. 4, the individual guide member elements 111 each comprises a simple pipe bent to a V-shape and extending through the casing 51 and the side wall 63 of a forming chamber so that the apex of the V lies over the horizontally, advancing sheet of glass 81 and upstream of the vertically ascending portion of the sheet of glass 81. The guide members may, however, be located downstream of the vertically ascending sheet of glass and function effectively in that location. Coolant such as water is directed through each of the guide member elements 111 shown in FIG. 4.

Figure 5:
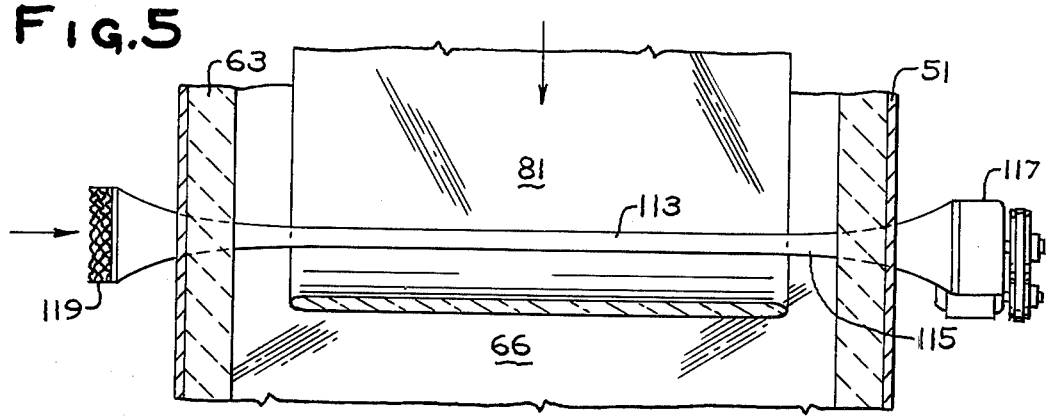

The embodiment of this invention shown in FIG. 5 is a transverse guide bar extending across the full width of the forming chamber. This guide bar 113 has enlarged end portions providing an outwardly angled marginal portion facing the upwardly ascending portion of the continuous sheet of glass 81 at its edges. This guide bar 113 is flared outwardly at its ends, an outwardly flared portion being indicated by numeral 115. Any of the contemplated guide bars may be provided with facilities for directing a gaseous coolant through it. Guide bar 113 is particularly suited for use with such a facility. As shown, it is provided with a fan 117 for drawing ambient air through a filter 119 mounted on a flared end of the guide member 113 and drawing that air through the guide member to adjust and maintain its temperature within a selected range during use.

Figure 6:
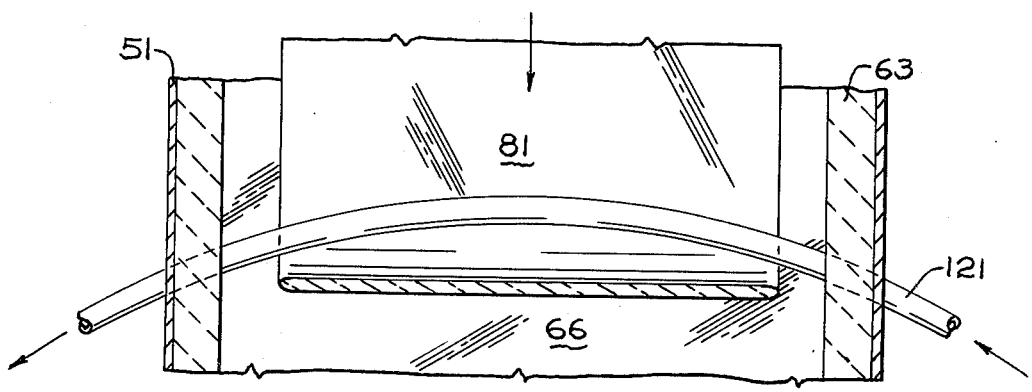

Referring now to FIG. 6, there is shown a guide extending across the full width of a forming chamber. This guide comprises a gently curved guide member 121 having a concave surface facing the upwardly ascending portion of the continuous sheet of glass 81 being produced within the forming chamber.

Figure 7:
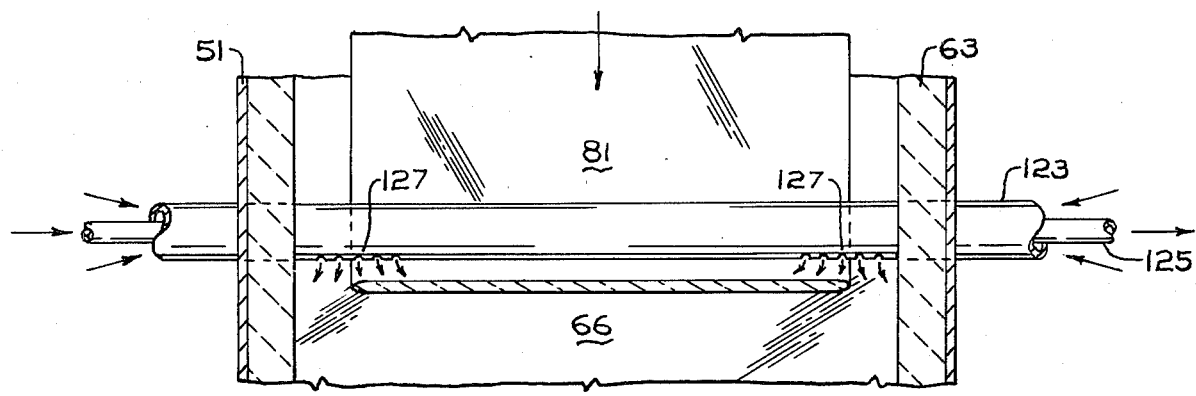

Shown in FIG. 7 is a further embodiment of this invention. A guide member extending across the width of a forming chamber comprises an outer tube 123 and an inner tube 125 mounted in fixed relation one to the other and providing an annular space between them. The outer tube 123 is provided with a series of orifices or apertures 127 on the downstream face of the tube facing the marginal edges of the upwardly ascending portion of a continuous sheet of glass 81 being produced in the chamber. A coolant, such as water, for example, is directed through the inner tube 125 and a non-oxidizing gas for protecting the molten metal in the forming chamber. The gas may be and preferably is a mixture of nitrogen and hydrogen. The gas is directed into the annular space between the inner tube 125 and the outer tube 123. This non-oxidizing gas then flows out through the apertures 127 in the outer tube 123 and provides a lubricating film of slightly pressurized gas between the upwardly ascending portion of a continuous sheet of glass 81 being produced and the outer tube 123 of the guide member. Should the upwardly ascending portion of the continuous sheet of glass 81 become disoriented and its marginal edges approach the apertures 127 closest to it, the film of gas adjacent to the apertures, being slightly pressurized, is effective to engage the glass and to prevent contact between the glass and the rigid outer tube, thus preventing marking off the glass. This embodiment of the invention is particularly useful when it is desired to position the guide member close to the surface of the pool of molten metal within the forming chamber where the glass is relatively hotter than it is at locations high above the pool of molten metal 66.

Figure 8:
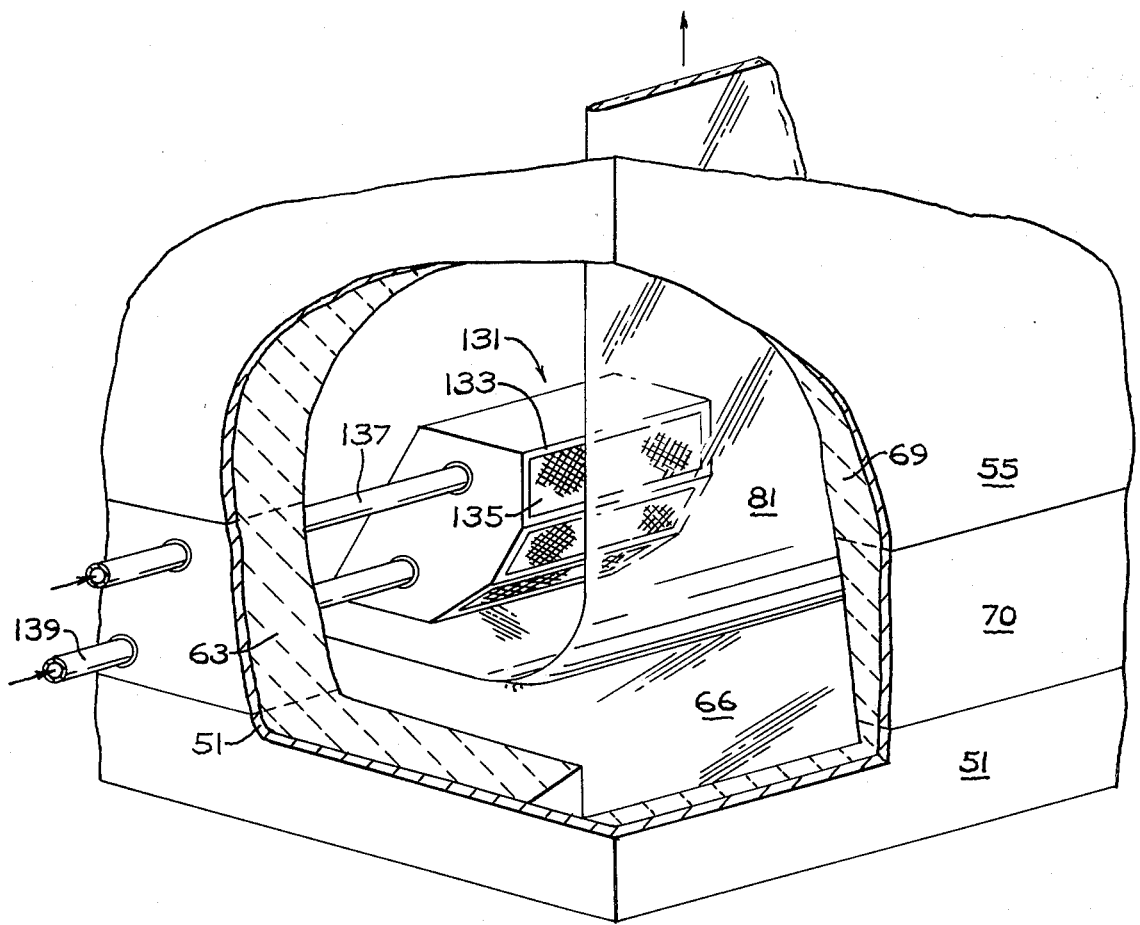
FIG. 8 is a partially cutaway perspective view of a liftoff region of a forming chamber, such as illustrated in FIGS. 1 and 2, showing a further embodiment of the present invention.

A still further embodiment of this invention is shown in FIG. 8. In this embodiment of the invention a non-oxidizing gas is directed both at the upwardly ascending ribbon of glass and also toward the location of liftoff of the sheet of glass 81 in the pool of molten metal 66. A gas distribution device 131 is provided having a plurality of glass facing surfaces 133 with each face being provided with a foraminous or perforate section through which a non-oxidizing gas may be directed toward the sheet of glass 81. The gas distribution device 131 is preferably divided into at least two sections for separately and independently feeding two or more streams of non-oxidizing gas into the chamber. An upper section is in communication with those faces 133 directly facing the upwardly ascending portion of the glass sheet 181, and the lower section is in communication with one or more faces 133 for directing the non-oxidizing gas toward the location of liftoff and toward the horizontally advancing glass sheet which is supported on the molten metal 66 prior to liftoff. These sections of the gas distribution device 131 are connected to conduits 137 and 139 which, in turn, are connected to an external source of non-oxidizing gas (not shown). This non-oxidizing gas, preferably a mixture of nitrogen and hydrogen, is fed through the conduits 137 and 139 to the chambers of the gas distribution element 131 and then the gas is distributed outwardly through the various perforate face sections toward the sheet of glass 81 in the forming chamber.

Although this invention has been described with reference to particular embodiments described by specific illustrative examples, it will be understood by those skilled in the art that variations may be made from the specific embodiments disclosed herewith without departing from the scope of this invention.

I claim:

1. In an apparatus for making flat glass comprising a forming chamber containing a pool of molten metal for receiving molten glass for forming, means for advancing the glass along a path on the surface of the pool of molten metal, means for cooling the glass during its advance, means for applying forces to the glass to form a continuous sheet of flat glass therefrom during its advance and means for contacting and lifting the continuous sheet of glass upwardly from the pool of molten metal and for conveying it substantially vertically upwardly therefrom wherein the first means for contacting and lifting the continuous sheet of glass is located a sufficient distance from the pool of molten metal to avoid marking the glass, the improvement comprising means for engaging the lifted portion of said glass sheet disposed below said first means transversely to the normal vertical path of travel of the lifted portion of the glass sheet and in spaced relation from the adjacent surface of the lifted portion of said sheet a distance sufficiently close to engage said sheet momentarily when said sheet intermittently moves from its normal vertical path of movement toward and into contact with said glass engaging means so as to cause said sheet to move toward its normal path of movement.

2. The apparatus according to claim 1 wherein said glass engaging means extends transversely across the full width of the forming chamber.

3. The apparatus according to claim 2 wherein said glass engaging means comprises a pipe.

4. The apparatus according to claim 3 wherein said glass engaging means further comprises an outer glass engaging surface material that does not stick to glass.

5. The apparatus according to claim 1 wherein said glass engaging means comprises at least two glass engaging elements one extending inwardly from each side of the forming chamber and partially transversely across it.

6. The apparatus according to claim 5 wherein said glass engaging elements are provided with means for extracting heat from the forming chamber.

7. The apparatus according to claim 1 wherein said glass engaging means presents a glass engaging surface to a sheet of glass being upwardly conveyed that is closer the plane for conveying the glass upwardly at the sides of the forming chamber than at the central portion of the forming chamber.

8. The apparatus according to claim 7 wherein said glass engaging means comprises at least two glass engaging elements, each having a V shape in plan view with an apex that overlies a portion of the pool of molten metal for supporting an advancing sheet of glass and a leg that is farthest from a location for receiving molten glass extends from the apex along the path for advancing a sheet of glass as it extends to a side of the forming chamber.

9. The apparatus according to claim 8 wherein each of said glass engaging elements comprises a pipe having a V shape.

10. The apparatus according to claim 7 wherein said glass engaging means comprises a conduit extending transversely across the forming chamber, said conduit being flared outwardly from its central portion for overlying the central portion of the pool of molten metal in the forming chamber.

11. The apparatus according to claim 10 further comprising means for directing a coolant through said conduit.

12. The apparatus according to claim 11 wherein said coolant directing means is a fan for directing a gaseous coolant through said conduit.

13. The apparatus according to claim 7 wherein said glass engaging means comprises a curved glass engaging element extending transversely across the forming chamber and having a concave surface for engaging a sheet of glass being conveyed upwardly, said concave surface facing away from a location for receiving molten glass into the forming chamber.

14. The apparatus according to claim 1 wherein said glass engaging means comprises means for directing a gas into the forming chamber at a rate sufficient to engage a sheet of glass being upwardly conveyed with the directed gas for maintaining the alignment of the sheet of glass as it is upwardly conveyed.

15. The apparatus according to claim 14 wherein said glass engaging means comprises a conduit for supplying a flow of gas, said conduit having a plurality of orifices in a portion of its surface for facing an upwardly conveyed sheet of glass through which the gas may flow toward the upwardly conveyed sheet of glass.

16. The apparatus according to claim 15 wherein said conduit is a pipe extending transversely across said forming chamber and having a plurality of orifices therein at two locations along its length, each location being spaced inwardly from a side of the forming chamber a sufficient distance to be in facing relation to an upwardly conveyed sheet of glass.

17. The apparatus according to claim 15 wherein said glass engaging means further comprises means for adjusting and maintaining the temperature of the gas supplied through said conduit.

18. The apparatus according to claim 14 wherein said means for directing a gas into the forming chamber comprises a gas distribution means for directing gas against a sheet of glass as it advances along the surface of the pool of molten metal and against the sheet of glass as it is conveyed upwardly from the pool of molten metal.

19. The apparatus according to claim 18 wherein said gas distribution means comprises an enclosure connected to gas supply conduits, said enclosure having perforated glass facing surfaces through which gas may flow.

20. The apparatus according to claim 19 wherein said enclosure includes at least two compartments, one in communication with a perforated surface for facing the sheet of glass as it advances along the surface of the pool of molten metal and one in communication with a perforated surface for facing the sheet of glass as it is conveyed upwardly from the pool of molten metal and wherein the separate compartments are connected to separate gas supply conduits.

21. In a method of making flat glass comprising the steps of delivering molten glass onto the surface of a pool of molten metal in an enclosed forming chamber, advancing the glass along the surface of the pool of molten metal, cooling the glass to form a continuous sheet of glass, advancing the sheet of glass along a path on the pool of molten metal and thereafter applying a tractive force to the sheet of glass for lifting the sheet of glass upwardly from the pool of molten metal and conveying it substantially vertically upwardly therefrom, wherein the tractive force is applied at a sufficient distance from the pool of molten metal to avoid marking the glass by its application and wherein the continuous sheet of glass being conveyed upwardly from the pool of molten metal to where the tractive force is applied is subject to movement from a desired path lying in a plane aligned normal to the surface of the pool of molten metal and normal to the path of advance of the glass along the surface of the pool of molten metal, the improvement comprising disposing a means for engaging the lifted portion of said glass sheet at a location below the point at which said tractive force is applied to said sheet and in a region extending both transversely to the normal vertical path of travel of the lifted portion of the sheet and in closely spaced relation to the adjacent surface of the lifted portion, and maintaining rhe spacing between said glass engaging means and the normal vertical path of travel of the lifted portion of said glass sheet sufficiently close to engage said sheet momentarily when said sheet intermittently moves from its normal vertical path of movement toward and into contact with said glass engaging means so as to cause said sheet to move toward its normal path of movement.

22. The method according to claim 21 which comprises cooling the means for engaging the lifted portion of said glass sheet.

23. The method according to claim 22 wherein the mechanical glass engaging means is cooled by directing a liquid coolant through it.

24. The method according to claim 22 wherein the mechanical glass engaging means is cooled by directing a gaseous coolant through it.

25. The method according to claim 21 wherein a gas is directed against at least the marginal portions of the continuous sheet of glass as it is conveyed upwardly to engage it and thus adjust and maintain its alignment with respect to the desired plane.

26. The method according to claim 25 wherein the directed gas is a non-oxidizing protective gas.

27. The method according to claim 26 wherein the temperature of the directed gas is adjusted and maintained immediately prior to being directed against the glass.

28. The method according to claim 25 wherein a gas is also directed against at least the marginal portions of the continuous sheet of glass as it is advanced along the surface of the pool of molten metal substantially immediately prior to being lifted therefrom.

* * * * *